United States Patent [19]

Cicatelli

[11] 4,192,197
[45] Mar. 11, 1980

[54] DISENGAGEABLE TRANSMISSION DEVICE

[75] Inventor: Rodolfo Cicatelli, Lugano, Switzerland

[73] Assignee: Autovox, S.p.A., Rome, Italy

[21] Appl. No.: 910,055

[22] Filed: May 26, 1978

[30] Foreign Application Priority Data

May 30, 1977 [IT] Italy .............................. 49612 A/77

[51] Int. Cl.² .......................................... F16H 35/00
[52] U.S. Cl. ..................................... 74/380; 74/384; 185/38; 185/40 R
[58] Field of Search ............. 74/380, 384, 89.16; 185/38, 40 R; 58/23 D, 116 R, 121 R

[56] References Cited

U.S. PATENT DOCUMENTS

| 2,669,832 | 2/1954 | Harris et al. ............... 74/380 X |
| 2,813,434 | 11/1957 | Stuebs ........................ 74/384 X |
| 4,128,015 | 12/1978 | Cicatelli ................... 185/40 R X |

*Primary Examiner*—William E. Lyddane
*Attorney, Agent, or Firm*—James W. Gillman; Melvin A. Klein; Phillip H. Melamed

[57] ABSTRACT

A disengageable transmission device is provided in which a driving pinion is used to selectively drive a driven wheel via a wheel train mounted on pivotal lever. The fulcrum of the pivotal lever is positioned so as to minimize the rotational torque effects on the wheel train lever of the contact between the driving pinion and the wheel train and of the contact between the driven wheel and the wheel train. An energy escapement control device is also provided and the torque effects of this device on the wheel train lever are also limited by the positioning of the fulcrum of the lever.

13 Claims, 3 Drawing Figures

DISENGAGEABLE TRANSMISSION DEVICE

BACKGROUND OF THE INVENTION

This invention refers to a disengageable transmission device.

A U.S. patent application Ser. No. 765,024 filed Feb. 2, 1977, now U.S. Pat. No. 4,128,015 describes a device for the storage of power and its controllable, slow rate release.

In that device a gear train, supported on a lever fulcrumed on the frame, is brought in and out of engagement with a power take-off (driving) pinion and, in its engaged position, loads a spring through a rack. In its disengaged position, the gear train is moved by this spring and an escapement causes the load of the spring to be released at a slow rate.

When the escapement is locked by means of a ratchet device, also the gear train is blocked and the spring is not released.

In the device of the U.S. patent application Ser. No. 765,024, the fulcrum of the lever coincides with the axis of the last gear in the gear train, which last gear is, in its turn, keyed to a pinion meshing with the rack.

In this way, the leverage of the rack with respect to the fulcrum of the lever, due to the elastic reaction of the spring, tends to rotate the lever into its disengaged position.

Moreover, another torque is applied to the lever by the driving pinion, when it meshes with the first gear of the gear train. Such a torque also tends to rotate the lever away from the driving pinion.

A further torque is generated on the lever by the ratchet device locking the escapement.

Such torques overload the lever when it is in either of the two positions of engagement or disengagement, disturbing also the passage from one position to the other.

Consequently this gear device is not suitable for the cases in which one wants, or must, actuate the engagement and disengagement of the transmission with low energy dissipation.

SUMMARY OF THE INVENTION

The object of this invention is to eliminate the aforementioned inconveniences, and in particular to provide a disengageable transmission device in which there is no torque acting on the gear train lever.

In one embodiment of the present invention a disengageable transmission device is provided in which a train of wheels is supported on a lever pivoted on a frame and movable between a drive engaging position, in which a first wheel of the train meshes with a driving element, and a drive disengaging position, in which said first wheel is withdrawn from meshing engagement with the driving element, a last wheel of the train remaining engaged with a driven element in both positions, wherein the improvement comprises the fulcrum of the lever coinciding with the tangential point of the pitch line of the last wheel of the train and the pitch line of the driven element.

According to another aspect of this invention, the fulcrum of the wheel train lever lies on the line of engagement between the driving element and the first wheel of the wheel train.

In the case in which the present device is utilized to load a spring, and therefore needs a locking ratchet device to selectively prevent the unloading of the spring, according to a further aspect of this invention, the fulcrum of the wheel train lever lies also on the line of reaction of the locking ratchet device.

In this way, the advantage is achieved that the reaction of the driven element does not provoke any rotational torque on the wheel train lever, and similarly the wheel train lever is neither affected by the torque of the driving element which, acting as a power take-off, loads the spring, nor affected by the possible torque of the reaction of the locking ratchet device.

Therefore, the lever can be moved with a minimum of power between its two resting positions, with the first wheel engaged with or disengaged from the driving element, respectively.

BRIEF DESCRIPTION OF THE DRAWINGS

An embodiment of the device according to this invention will now be described by way of non-restrictive example, referring to the accompanying drawing, in which.

DESCRIPTION OF THE PREFERRED EMBODIMENT

Figure 1:
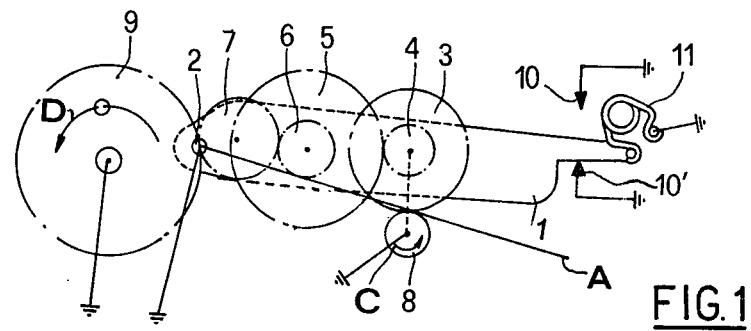
FIG. 1 is a schematic representation of the principle of the device.

With particular reference to FIG. 1 of the drawings, it can be seen how, according to an outline of the principles of the device, in conformity with this invention, a lever 1, having its fulcrum on the pivot 2 attached to a frame (not shown), supports a wheel train composed of a toothed wheel 3 integral with a pinion 4, a toothed wheel 5 integral with a pinion 6, and a toothed wheel 7.

The gears are suitable for transmitting the motion from a driving pinion 8 to a driven toothed wheel 9, when the lever 1 is in its engaged position shown in FIG. 1.

According to this invention, the axis of the pivot 2, which is the fulcrum of the lever 1, coincides with the tangential point of the pitch circles of the transmission wheels 7 and 9.

When a rack is used as driven element, it is obvious that the axis of the pivot 2, which is the fulcrum of the lever 1, must correspond to the tangential point of the pitch circle of the last wheel 7 of the transmission train and the pitch line of the rack. Therefore, in general, the axis of the pivot 2 will coincide with the tangential point of the pitch line of the last wheel of the train and the pitch line of the driven element.

Moreover, still according to the invention, the axis of the pivot 2 lies also on the line A of action of the engagement (the linear direction of the applied force) between the driving pinion 8 and the first gear 3 of the wheel train, when the pinion 8 rotates in the direction of the arrow C in FIG. 1, anti-clockwise as viewed in the drawing, in which case the gear 9 will rotate in the direction of the arrow D (anti-clockwise as viewed in the drawing).

With this arrangement, the movement of the pinion 8 on the gear 3 and the reaction of the wheel 9 do not cause or produce any torque on the lever 1. The lever 1 can then be moved with a minimum of power between its engaged position shown in FIG. 1, and its disengaged position, in which the lever 1 abuts against an abutment stop 10 rigid with the frame. In its engaged position the lever 1 on the contrary abuts against an abutment stop 10'. An ordinary bistable spring 11 can keep the lever 1 in one of its two resting positions.

It is moreover worth noting that, if the driving pinion 8 is rotated clockwise as viewed in the drawing, that is in the direction opposite to the arrow C, the torque caused by the engagement force no longer is annulled as for the lever 1, because the line of the engagement action no longer passes through the fulcrum of the lever 1. This torque will compel the lever 1 to overcome the force of the spring 11, thus forming a self-disengaging system. Thus the transmission does become broken if the wheel 9 cannot rotate clockwise as viewed in the drawing, that is in the direction opposite to the arrow D, if the pinion 8 rotates clockwise. Of course the rotational angle of the lever 1, around the pivot 2 will be very small, nevertheless adequate to disengage the gear 3 from the driving pinion 8.

Moreover, even following the teachings of the present invention owing to the unavoidable imperfections and dissymmetries arising during manufacture, in the completed mechanism the torques acting on the lever 1 will never be completely nullified; however, they can be kept very small, depending on the machining accuracy.

Figure 2:
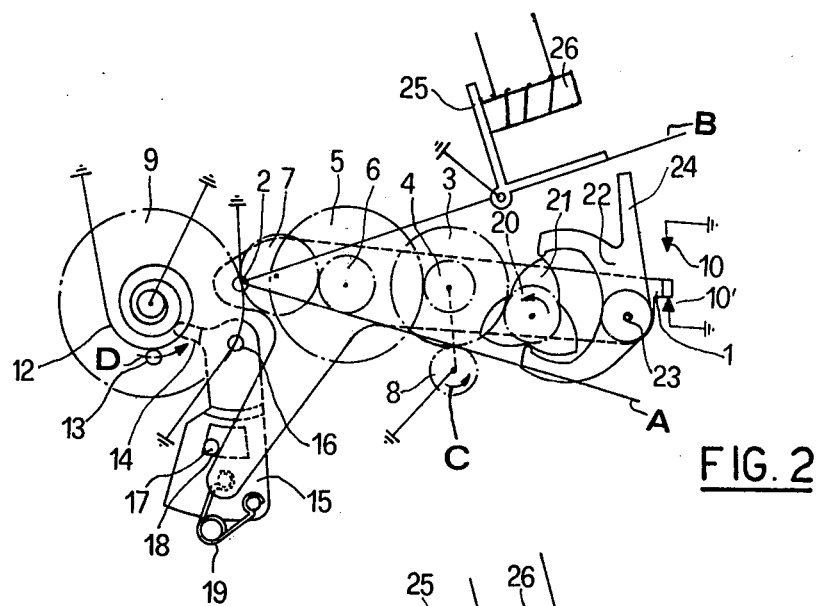
FIG. 2 shows the device in its engaged position.
Figure 3:
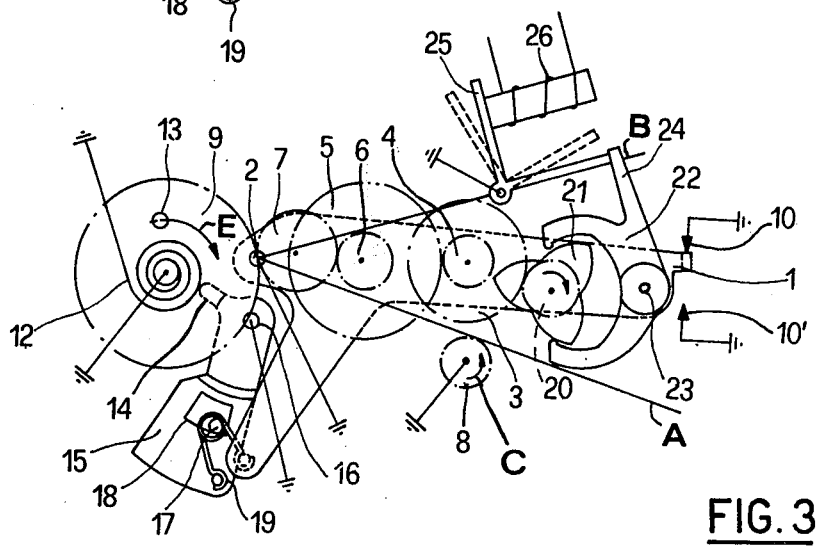
FIG. 3 shows the device in its disengaged position.

In the FIGS. 2 and 3 a device is shown utilizing the basic principles of FIG. 1. Analogous parts are referred to with the same numbers as in FIG. 1.

The toothed wheel 9, intended to wind up a spring 12, is connected to a mechanism 13 that has to rotate approximately 360° both in the direction of arrow D, when the wheel 9 is driven by the spring 12, in order to fulfill, for instance, a certain sequence of operations.

In the case shown in FIG. 2 the driving pinion 8 rotates the wheel 9 when the lever 1 is in the position shown in FIG. 2, and the wheel 9 winds up the spring 12 until a projection 13 of the gear 9 runs up against a tooth 14 of a lever 15, having its fulcrum on a pivot 16. As the wheel 9 continues rotating, the lever 15 is rotated on the pivot 16, and a side of a slot 18 in the lever 15 leaves an abutment stop 17, until a bistable spring 19 connected between lever 15 and lever 1, analogous to the spring 11 in FIG. 1, is moved beyond its dead point, causing the lever 1 to snap into its disengaged position, shown in FIG. 3, and causing the lever 15 to bear with the other side of its slot 18 against the abutment stop 17, as shown in FIG. 3.

In the situation shown in FIG. 3, the spring 12 unwinds, rotating the gear 9 in the direction of the arrow E which is opposite to the direction D. In order to control this unwinding, a pinion 20 integral with a three-lobed wheel 21, and a small anchor 22 matching with the three-lobed wheel 21 are pivoted on the level 1. The anchor 22, pivoted at 23, has a projecting tooth 24 intended to be engaged by the movable part 25 of a locking relay 26 when the lever 1 is in its disengaged position and the relay 26 is energized, so that the movable part 25 is in the position shown with an unbroken line in FIG. 3. When the relay 26 is de-energized, the movable part 25 moves to the position shown by a broken line in FIG. 3, for instance under the action of a spring not shown in the drawing, and the small anchor 22 becomes free to oscillate, permitting the gear 9 to slowly rotate under the action of the spring 12.

The two elements 21 and 22 represent an additional gearing up ratio, which reduces to the minimum the force between the tooth 24 of the anchor 22 and the movable part 25 of the relay 26, multiplying at the same time the oscillations of the anchor. In this way the anchor can be utilized both as a control and as an equalizer of the output of this device, when the spring 12 is unwinding. Moreover, by resiliently connecting a weight to the anchor 22, it is possible to have the system oscillating with a well defined speed.

It is important to note that, according to this invention, the line B of the reaction of the locking ratchet device, comprising the movable part 25 and anchor tooth 24, crosses the axis of the pivot 2, which is the fulcrum of the lever 1. In this way the locking ratchet's engaging reaction does not affect the lever 1. Therefore, the engaging reaction of the locking ratchet device does not induce the lever 1 to leave the position shown in FIG. 3. The line of reaction of the ratchet device is the linear direction of the force created by the device preventing the discharge of the energy of spring 12.

After the gear 9 has rotated through approximately 360°, in the direction of the arrow E, the projection 13 contacts the tooth 14 of the lever 15 causing the lever 15 to rotate anti-clockwise, as viewed in the drawing, until the bistable spring 19 passes beyond its dead point causing the lever 1 to snap into its engaged position, as shown in FIG. 2.

Of course the wheel 21 may have more than three lobes and the two elements 21 and 22 may be substituted by any other escapement system. Moreover, alternative locking ratchet devices can be utilized.

When the reaction of the locking ratchet device is sufficiently small, (because the motion is adequately geared up by the transmission device, for example), the line of this reaction force can be displaced noticeably away from the fulcrum 2 of the lever 1, without this causing any disturbance to the operation.

It is obvious that numerous other modifications can be applied by the experts in this art to the above described embodiment of the present invention, without departing from the spirit of it; it is understood that all such possible alterations are included in the scope of this invention.

I claim:

1. A disengageable transmission device, in which a train of wheels is supported on a lever pivoted on a frame and movable between a drive engaging position, in which a first wheel of the train meshes with a driving element, and a drive disengaging position, in which said first wheel is withdrawn from meshing engagement with the driving element, a last wheel of the train remaining engaged with a driven element in both the drive engaging and disengaging positions, the improvement of the transmission device comprising the fact, that the fulcrum of the lever coincides with the tangential point of the pitch line of the last wheel of the train and the pitch line of the driven element.

2. A disengageable transmission device, in which a train of wheels is supported on a lever pivoted on a frame and movable between a drive engaging position, in which a first wheel of the train meshes with a driving element, and a drive disengaging position, in which said first wheel is withdrawn from meshing engagement with the driving element, a last wheel of the train remaining engaged with a driven element in both positions, the transmission device, characterized in that the fulcrum of the lever lies on the line of action of the engagement between the driving element and the first wheel of the wheel train.

3. A disengageable transmission device, in which a train of wheels is supported on a lever pivoted on a frame and movable between a drive engaging position, in which the first wheel of the train meshes with a driving element, and a drive disengaging position, in which said first wheel is withdrawn from meshing engagement with the driving element, a last wheel of the train remaining engaged, in both positions, with a driven element which loads a spring, and in which a locking ratchet device is provided for locking the energy release of the spring, the improvement in the transmission device comprising the fact that the fulcrum of the lever lies on the line of reaction of the locking ratchet device.

4. A device according to claim 1 or 2, in which the driven element winds up a spring when the lever is in its drive engaging position, and wherein the driven element coacts with a bistable means to drive the lever into its drive disengaging position in response to the driven element reaching a predetermined position whereby it is required to interrupt the winding of the spring.

5. A device according to claim 4, in which said bistable means comprises: a projection on the driven element; a bistable lever pivoted on the frame and having a tooth engageable by said projection; and a bistable spring connecting said bistable lever with said wheel train lever, stop means also being provided on the frame for limiting the rotational angle of said bistable lever.

6. A device according to claim 4 in which the wheel train includes an escapement system to restrain the release of the energy from said spring, when the wheel train lever is in its disengaged position.

7. A device according to claim 6, in which said escapement system is composed of a multi-lobed wheel and a matching anchor.

8. A device according to claim 6, in which said escapement system can be locked by a suitable locking ratchet device.

9. A device according to claim 8, in which the locking ratchet device comprises the movable part of a locking relay.

10. A device according to claim 9 in which the line of reaction of said movable part of the locking relay crosses the fulcrum of the wheel train lever, and wherein said escapement system is mounted on said wheel train lever.

11. A device according to claim 7, in which said escapement system can be locked by a suitable locking ratchet device.

12. A device according to claim 11, in which the locking ratchet device comprises the movable part of a locking relay.

13. A device according to claim 12 in which the line of reaction of said movable part of the locking relay crosses the fulcrum of the wheel train lever, and wherein said escapement system is mounted on said wheel train lever.

* * * * *